July 1, 1924.  
C. C. FARMER  
SLACK ADJUSTER  
Filed May 19, 1923

1,499,357

INVENTOR  
CLYDE C. FARMER  
BY *Wm. M. Cady*  
ATTORNEY

Patented July 1, 1924.

1,499,357

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SLACK ADJUSTER.

Application filed May 19, 1923. Serial No. 640,179.

*To all whom it may concern:*

Be it known that I, CLYDE C. FARMER, a citizen of the United States, residing at Pittsburgh, in the county of Allegheny and State of Pennsylvania, have invented new and useful Improvements in Slack Adjusters, of which the following is a specification.

This invention relates to slack adjusters, and more particularly to an automatic slack adjuster for taking up slack due to the wear of the brake shoes on the car wheels.

With certain types of automatic slack adjusters, the movable parts of the adjuster have a tendency to operate when not intended due to the action of momentum when the car is subjected to sudden shocks, as may occur in switching and in making up trains and the like, with the result that slack is taken up when not required to compensate for wear of the brake shoes.

The principal object of my invention is to provide means for preventing the accidental operation of the slack adjuster under the above conditions, the present invention being in the nature of an improvement on the construction disclosed in my prior Patent No. 1,446,168, dated February 20, 1923.

Figure 1:
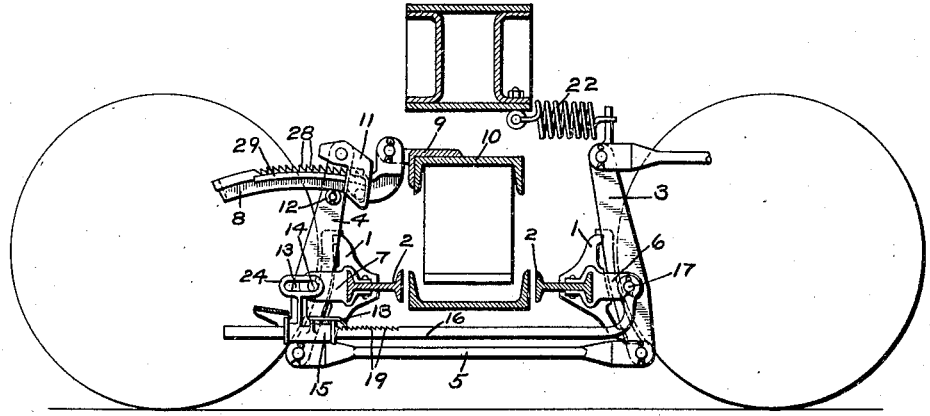
Figure 2:
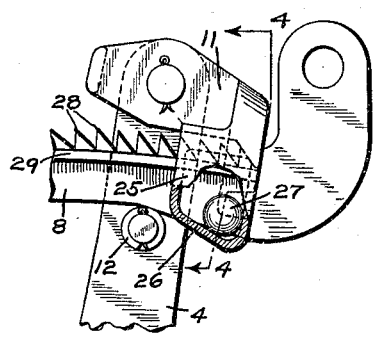
Figure 3:
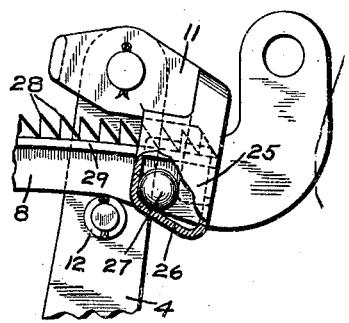
Figure 4:
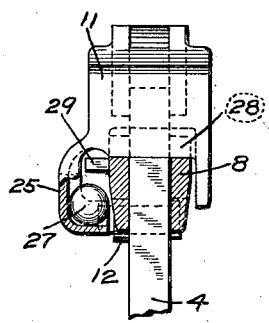

In the accompanying drawing; Fig. 1 is a vertical longitudinal section of a car truck equipped with a slack adjuster embodying my invention; Fig. 2 is an enlarged detail view of the pawl and ratchet portion of the slack adjuster, showing the parts in normal position; Fig. 3 a view similar to Fig. 2, showing the parts in the position assumed when the car is subjected to a sudden shock; and Fig. 4 a section on the line 4—4 of Fig. 2.

In Fig. 1 of the drawings is shown the usual car brake mechanism comprising brake shoes 1 carried by brake beams 2, a live brake lever 3, operatively connected to the brake cylinder (not shown), and a dead lever 4, pivotally connected to the live lever by a rigid rod 5, the brake beams being pivotally connected to the levers 3 and 4 by lugs 6 and 7 respectively.

The slack adjuster comprises a ratchet bar 8, pivotally supported by a bracket 9, secured to the bolster 10, and pivoted to the dead lever 4 is a pawl 11 adapted to engage the teeth of the ratchet bar 8, the under side of the bar 8 being adapted to rest on a roller 12 secured to the lever 4. A sleeve 15 is mounted on an adjusting rod 16, having its opposite end pivotally secured to the pivot pin 17 of the live lever 3. Secured to the sleeve 15 is a detent 18 adapted to engage teeth 19 cut on the rod 16 and carried by the sleeve 15 is a lug 24, having an elongated slot 13 through which the pivot pin 14 extends.

In order to shift the brake rigging members back to release position after the brakes have been applied, a release spring 22 attached at one end to a fixed portion of the car truck is connected at its other end to a projecting portion of the live lever 3.

The operation of the slack adjuster as so far described is as follows: When the brakes are applied by operation of the brake cylinder in the usual way, the live lever 3 is moved against the resistance of the spring 22. The lower ends of the levers 3 and 4 being maintained at a constant distance apart by the rod 5, the brake beams 2 are separated, causing the brake shoes 1 to be applied to the car wheels 23.

The pivot pins 14 and 17 are thus separated, and in the normal operation of the brake, the amount of separation is just equal to the length of the slot 13. When, due to the wear of the brake shoes, the movement exceeds the normal amount, the pin 14 will engage the end of the slot 13 and move the sleeve 15 along the rod 16, the distance of one or more teeth 19. When the live lever 3 assumes its normal position upon release of the brakes, the detent 18 will prevent return movement of the sleeve, and the pin 14 finally engaging the opposite end of the slot 13 will cause a movement of the dead lever 4 and the pawl 11 over one or more of the teeth on the ratchet bar 8, to complete the operation of taking up slack.

According to my invention, in order to prevent accidental movement of the dead lever 4 and the pawl 11 from taking up slack through momentum action of the parts, when the car is subjected to sudden shocks, the pawl 11 is provided with a downwardly extending pocket section 25 having an interior inclined face 26 and resting on said face is a metal ball 27 which normally tends to gravitate to the position shown in Fig. 2. At one side just below the teeth 28, the ratchet bar 8 is provided with a rib or flange 29, so positioned that the ball 27 is interposed between the inclined face 26 of the pocket 25 and the under face of the rib 29.

In operation, when the car is subjected to a sudden shock in a direction tending to shift the lever 4 and the pawl 11 along the teeth of the ratchet bar 8, the ball 27 will be moved up the inclined face 26 of the pocket 25 by the momentum effect of the shock, so that the ball will assume the position shown in Fig. 3. In this position, there is not sufficient clearance space between the ball and the under face of the rib 29 to permit the pawl 11 to move enough so that the pawl can slip past the adjacent tooth of the ratchet bar 8 and the consequence is that the pawl is prevented from taking up shack due to any tendency of the lever 4 to shift the pawl when the car is subjected to a shock.

When the ball 27 is in its normal position, as shown in Fig. 2, there is ample clearance space between the ball and the under face of the rib 29, to permit the necessary upward movement of the pawl 11, as required in the normal operation of the slack adjuster to take up slack, in order that the pawl may ride over the teeth 28 of the ratchet bar 8 to the new position of adjustment.

Having now described my invention, what I claim as new and desire to secure by Letters Patent, is:—

1. In a slack adjuster, the combination with a ratchet bar having teeth and a pawl engaging the teeth of the ratchet bar, of a movable member interposed between the pawl and the ratchet bar and movable by momentum to a position for preventing said pawl from disengaging from the teeth of the ratchet bar.

2. In a slack adjuster, the combination with a ratchet bar having teeth and a pawl engaging the teeth of the ratchet bar, of a movable member carried by said pawl and movable by momentum to a position in which said member is adapted to prevent the disengagement of the pawl from the teeth of the ratchet bar.

3. In a slack adjuster, the combination with a ratchet bar having teeth and a pawl engaging the teeth of the ratchet bar, of a ball, a pocket carried by said pawl and having an inclined face on which said ball rests, and means on said ratchet bar engageable by said ball for limiting the movement of said pawl.

4. In a slack adjuster, the combination with a ratchet bar having teeth and a pawl engaging the teeth of the ratchet bar, of a pocket associated with said pawl and having an inclined face and a ball resting on said face and movable on said face by momentum to a position for limiting the movement of the pawl relative to said ratchet bar.

In testimony whereof I have hereunto set my hand.

CLYDE C. FARMER.